(12) United States Patent
Lustenberger

(10) Patent No.: US 9,534,948 B2
(45) Date of Patent: Jan. 3, 2017

(54) METHOD AND DEVICE FOR MEASURING THE WEIGHT OF A LOAD TO BE HOISTED ONTO A LOADING AREA

(75) Inventor: Martin Lustenberger, Villars sur Glane (CH)

(73) Assignee: DIGI SENS AG, Murten (CH)

(*) Notice: Subject to any disclaimer, the term of this patent is extended or adjusted under 35 U.S.C. 154(b) by 235 days.

(21) Appl. No.: 13/984,490

(22) PCT Filed: Feb. 6, 2012

(86) PCT No.: PCT/CH2012/000031
§ 371 (c)(1),
(2), (4) Date: Oct. 14, 2013

(87) PCT Pub. No.: WO2012/106826
PCT Pub. Date: Aug. 16, 2012

(65) Prior Publication Data
US 2014/0069728 A1    Mar. 13, 2014

(30) Foreign Application Priority Data
Feb. 11, 2011    (CH) .......................... 248/11

(51) Int. Cl.
*B60P 1/64*    (2006.01)
*G01G 19/12*    (2006.01)
*G01M 1/12*    (2006.01)

(52) U.S. Cl.
CPC .............. *G01G 19/12* (2013.01); *B60P 1/6463* (2013.01); *G01M 1/122* (2013.01)

(58) Field of Classification Search
CPC ........ G01G 9/00; G01G 19/08; G01G 19/083; G01G 19/12; G01G 19/14; G01G 19/18; G01G 23/3728; G01M 1/122; B60P 1/6463
See application file for complete search history.

(56) References Cited

U.S. PATENT DOCUMENTS 3,059,710 A * 10/1962 Pien .............................. 177/136
3,426,586 A *  2/1969 Kadlec ........................... 73/767
3,695,096 A * 10/1972 Kutsay ............................ 73/761
(Continued)

FOREIGN PATENT DOCUMENTS

DE    199 63 402 A1    7/2001
GB    2332425 A    6/1999
(Continued)

OTHER PUBLICATIONS

Koch, Florian, International Search Report, dated Jun. 22, 2012.

*Primary Examiner* — Randy W Gibson
(74) *Attorney, Agent, or Firm* — Winstead PC

(57) ABSTRACT

The invention provides a method and a device for measuring the weight of a load, which is displaced with a load lifting device over the edge of a raised loading surface and thus pulled onto the same or pushed down from the same, wherein during this operating process, in a support of the load lifting device loaded by the load, the force currently acting due to the displacement of the load is measured during the passage through a predetermined weighing window and the weight of the load is determined mathematically from the course thereof. Preferably, the load sensor is constructed as a tube which is equipped with two deformation sensors equipped essentially at right angles to one another.

20 Claims, 6 Drawing Sheets

(56) References Cited

U.S. PATENT DOCUMENTS

Figure 1:
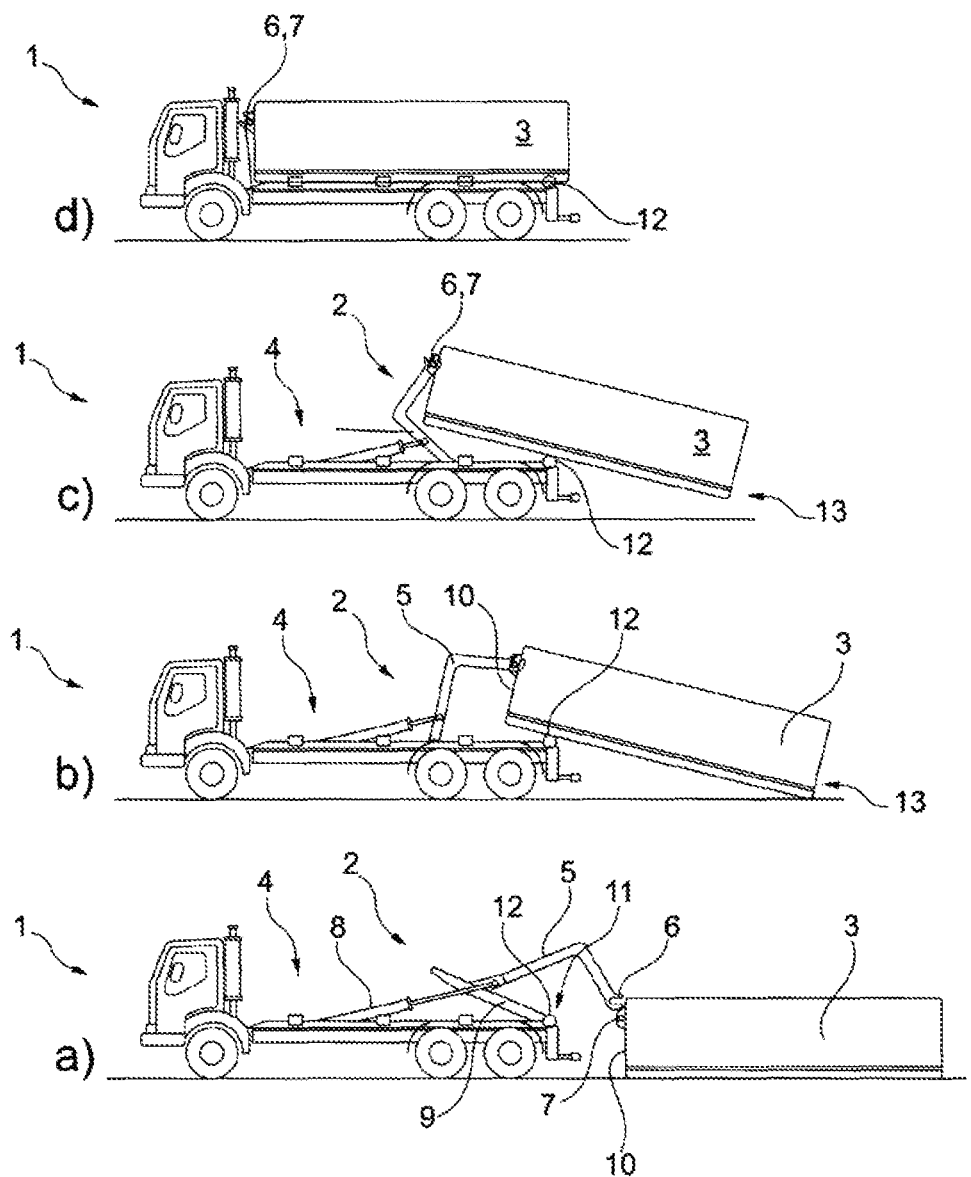

| | | | | |
|---|---|---|---|---|
| 3,857,452 | A * | 12/1974 | Hartman | 177/139 |
| 3,971,451 | A * | 7/1976 | Norberg | 177/1 |
| 4,499,960 | A * | 2/1985 | Ehrich et al. | 177/25.14 |
| 4,614,245 | A * | 9/1986 | Yamanaka | 177/210 FP |
| 4,623,813 | A * | 11/1986 | Naito et al. | 310/313 R |
| 4,694,921 | A * | 9/1987 | Johnston | 177/136 |
| 4,714,122 | A * | 12/1987 | Appleton et al. | 177/139 |
| 4,771,837 | A * | 9/1988 | Appleton et al. | 177/139 |
| 4,782,904 | A * | 11/1988 | Brock | 177/185 |
| 4,854,406 | A * | 8/1989 | Appleton et al. | 177/139 |
| 4,967,857 | A * | 11/1990 | Kent et al. | 177/145 |
| 5,178,226 | A * | 1/1993 | Bowman et al. | 177/139 |
| 5,209,313 | A * | 5/1993 | Brodrick et al. | 177/139 |
| 5,220,970 | A * | 6/1993 | Bachmann | 177/178 |
| 5,230,393 | A * | 7/1993 | Mezey | B65F 3/08 177/139 |
| 5,245,137 | A * | 9/1993 | Bowman et al. | 177/139 |
| 5,300,736 | A * | 4/1994 | Ehrhardt | G01G 15/00 177/1 |
| 5,509,293 | A * | 4/1996 | Karumanchi | 73/1.13 |
| 5,601,393 | A | 2/1997 | Waldschmitt | |
| 5,824,965 | A * | 10/1998 | Fujii et al. | 177/136 |
| 5,837,945 | A * | 11/1998 | Cornwell et al. | 177/139 |
| 5,929,389 | A * | 7/1999 | Keuper | 177/141 |
| 6,703,569 | B2 * | 3/2004 | Moore et al. | 177/136 |
| 6,769,315 | B2 * | 8/2004 | Stevenson et al. | 73/862.629 |
| 8,507,810 | B2 * | 8/2013 | Lustenberger | 177/136 |
| 8,716,609 | B2 * | 5/2014 | Pangrazio et al. | 177/136 |
| 2007/0290461 | A1 * | 12/2007 | Oscarsson | B60G 11/28 280/6.15 |
| 2011/0196623 | A1 * | 8/2011 | Hakkinen | B60P 1/6463 702/41 |
| 2013/0062127 | A1 * | 3/2013 | Pangrazio | G01G 19/08 177/1 |

FOREIGN PATENT DOCUMENTS

| | | |
|---|---|---|
| GB | 2 461 273 A | 12/2009 |
| JP | 2006 052084 A | 2/2006 |
| JP | 2008 002913 A | 1/2008 |
| WO | WO-2008/131574 A1 | 11/2008 |

* cited by examiner (state of the art)

METHOD AND DEVICE FOR MEASURING THE WEIGHT OF A LOAD TO BE HOISTED ONTO A LOADING AREA

The present invention relates to a measuring method according to the preamble of Claim 1 and a measuring device for executing this method according to the preamble of Claim 12.

Transported goods are often collected together in skips or containers and the corresponding container is then picked up by a goods vehicle, transported and unloaded again at the target location. Generally, the weight of the filled container, i.e. the container loaded by the goods vehicle, is not known, so that the permitted overall weight of the goods vehicle may be exceeded without realising. Determining the weight of a container or the transported load may however also be required for calculating the transport costs or for other purposes.

Often, weighing installations for goods vehicles are not present at the respective loading or target location, which is particularly problematic in the case of the permitted overall weight, as far as the weighing installation, some distance has already been covered illegally and (in the case of overloading) returning to reduce the transport weight is uneconomical.

Skips are heaved in a freely-swinging manner with the aid of a boom of the goods vehicle onto the loading surface thereof, likewise for example waste containers, which are grasped by correspondingly equipped refuse vehicles by means of pivotable supports in front of the front end of the refuse vehicle, heaved above the driver's cab thereof and then tipped from above into the loading space of the refuse vehicle. Here, solutions for measuring the weight of the loaded load have become known which are however bound to the fact that during the loading process, the load is suspended completely on the loading organs or supported by the same for a moment. The measurement of the weight then takes place during this moment.

Increasingly however, containers with substantially larger transport load compared to skips are being transported, which containers also have substantially larger dimensions, so that the loading systems for skips or smaller transport containers are not sufficient.

U.S. Pat. No. 5,601,393 and GB 2 332 425 show load lifting devices for goods vehicles which are constructed as hook devices and can be used for the loading/unloading of large containers also. In this case, the container is grasped at the front end by the hook of the load lifting device, lifted over the edge of the loading surface of the goods vehicle and pulled onto the same. In this case, the bottom of the container slips over the edge of the loading surface, which is generally provided with rollers for this reason. The load lifting device does not have to be able to support the entire weight of the container in this substantially more efficient loading process, likewise the complex fastening on the lifting device, as would be necessary for a container which swings freely during loading, is dispensed with.

Here, suggestions have become known for providing the structure of the goods vehicle with measuring cells for determining the weight of the loaded load, which however requires complex installation operations in the chassis and the corresponding outlay (removal of the structure) in the case of repair. Such an embodiment has become known from JP 2008-002913 of Shin Meiwa Ind. Co. Ltd. The outlay required by this embodiment is considerable, as the load cells must be built into the chassis, which load cells support the entire load of a container (up to 40 t or more) and at the same time can deliver precise measured values.

Accordingly, it is the object of the present invention to create a method and a device which, without a relatively large outlay, already during the loading/unloading enables the detection of the weight of a load which is displaced with a load lifting device over the edge of a raised loading surface and thus is pulled onto the same or pushed down from the same.

This object is achieved by means of a method according to Claim 1 and a device according to Claim 12.

Due to the fact that a currently acting force in a support of the load lifting device is detected for determining the load during the passage through a predetermined movement position, a particularly simple possibility of determining the same mathematically results, with the additional advantage that the conversion of a load lifting device of the type mentioned above to a measuring device is dispensed with exceptionally easily. The costs therefor are only a fraction of the costs which are required for equipping a goods vehicle with load measuring cells arranged in the chassis (i.e. determining the weight of the loaded container).

Although the invention is illustrated on the basis of a container to be transported by a goods vehicle, its area of application comprises any type of load which, for loading/unloading a raised surface (which can also be stationary), is slid over the edge thereof, and thus is pulled onto the same or is pushed down from the same.

Figure 2A:
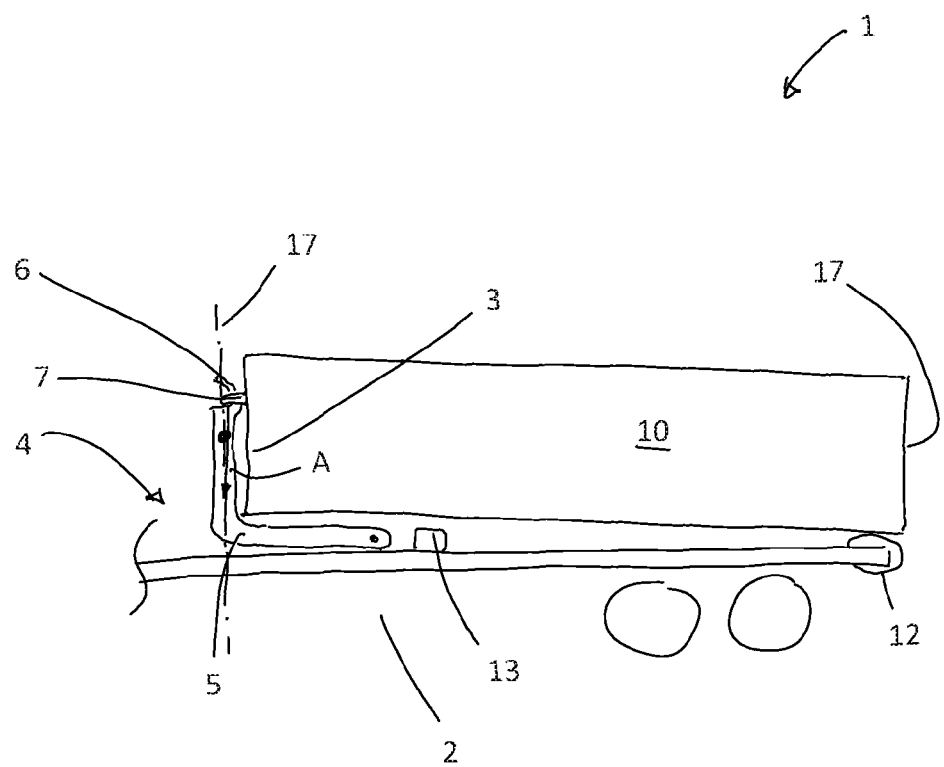
Figure 2B:
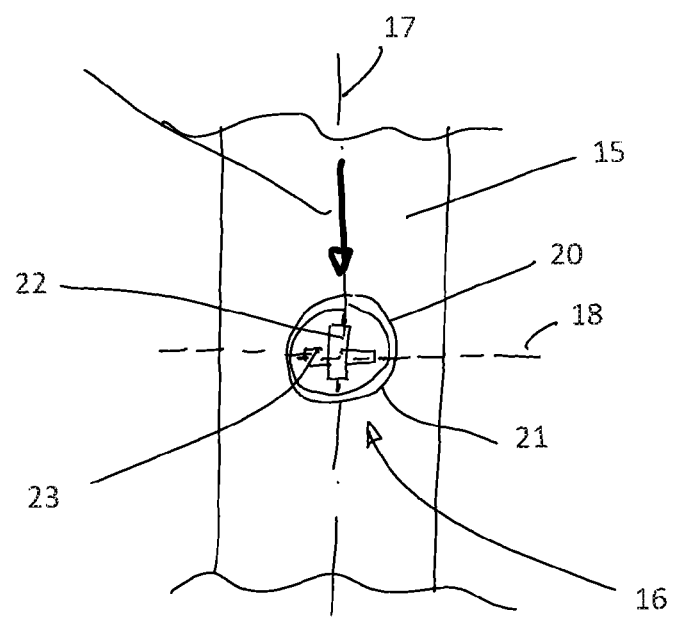
Figure 3A:
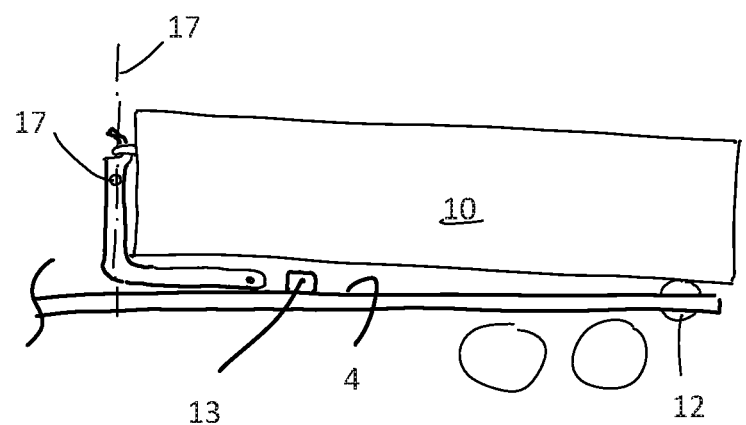
Figure 3B:
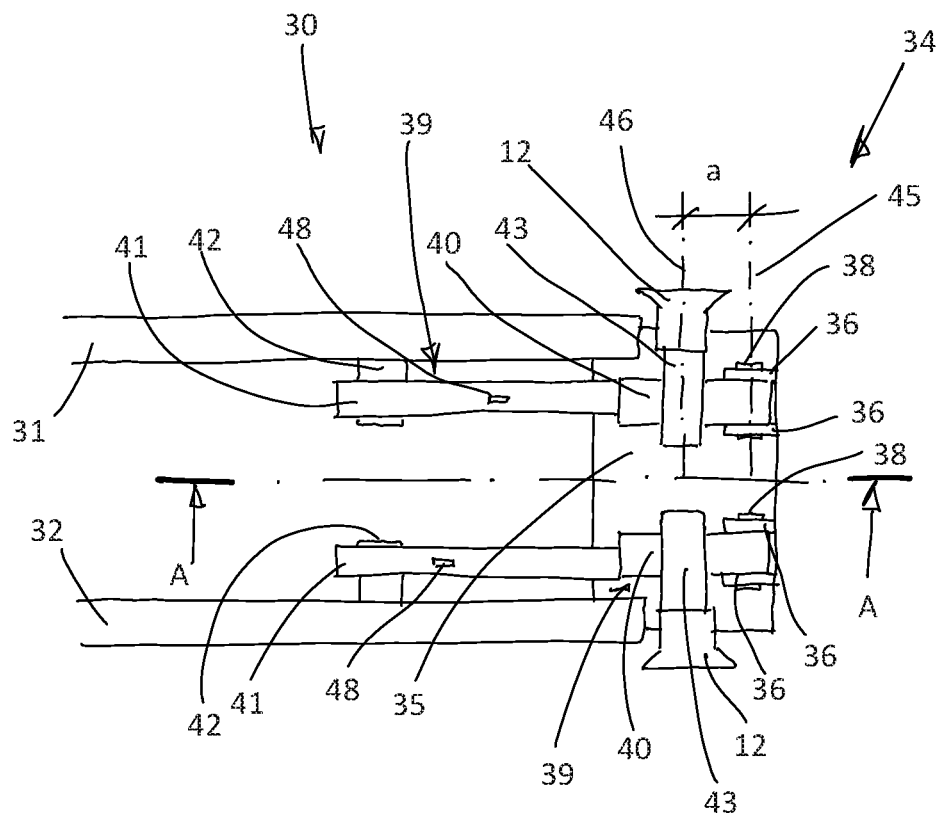
Figure 3C:
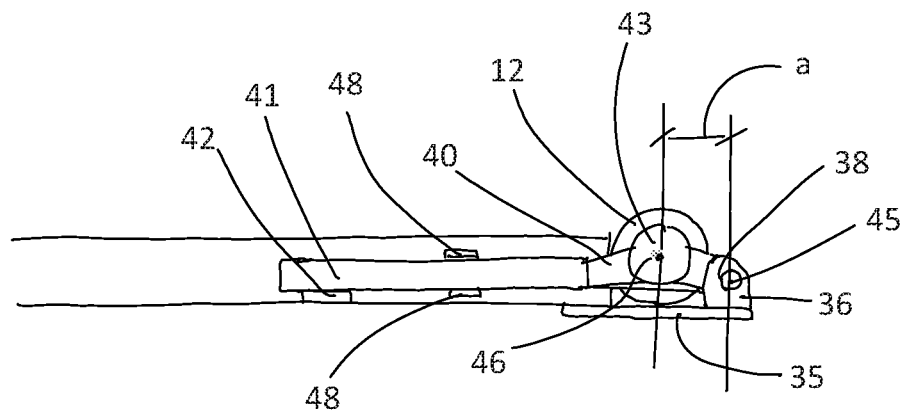
Figure 4A:
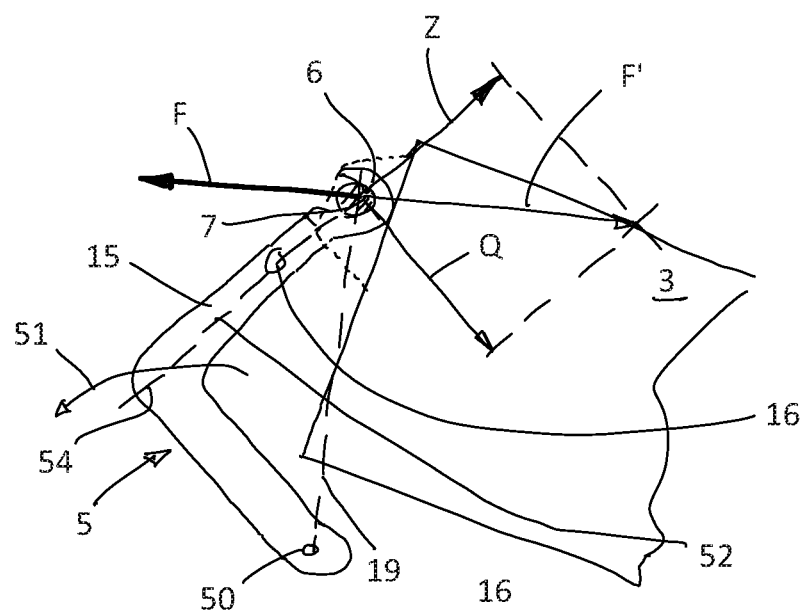
Figure 4B:
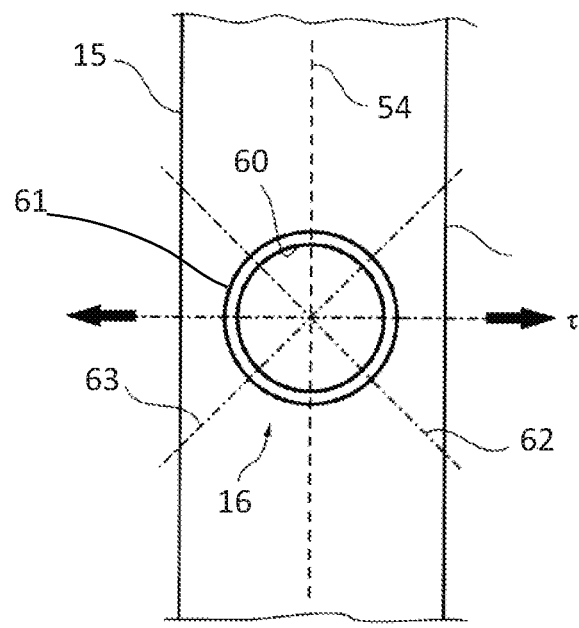
Figure 4C:
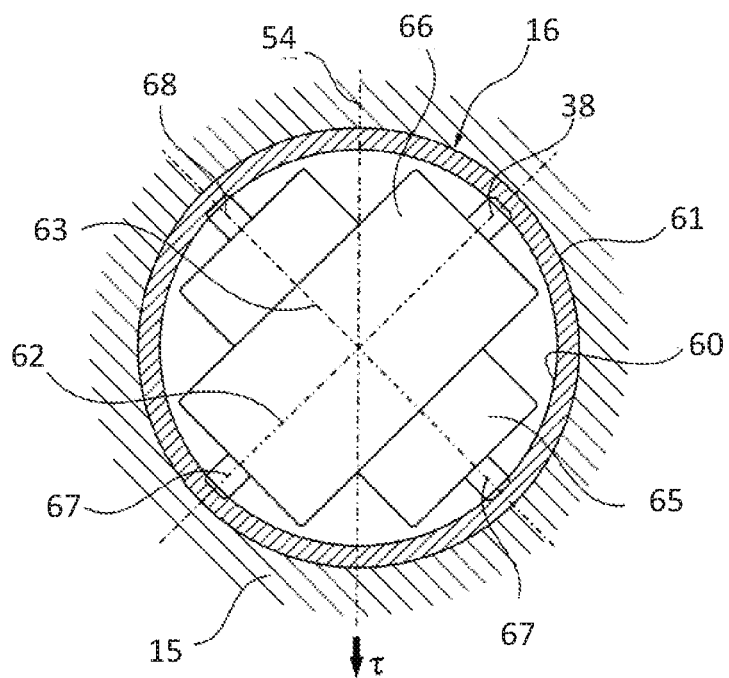
Figure 4D:
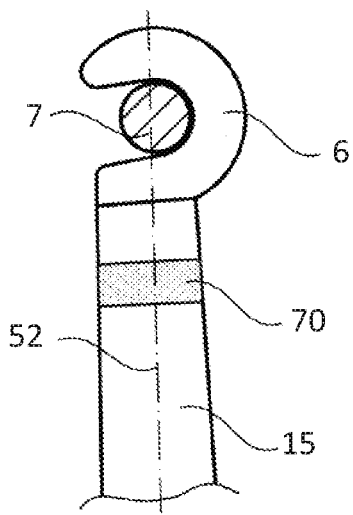
Figure 4E:
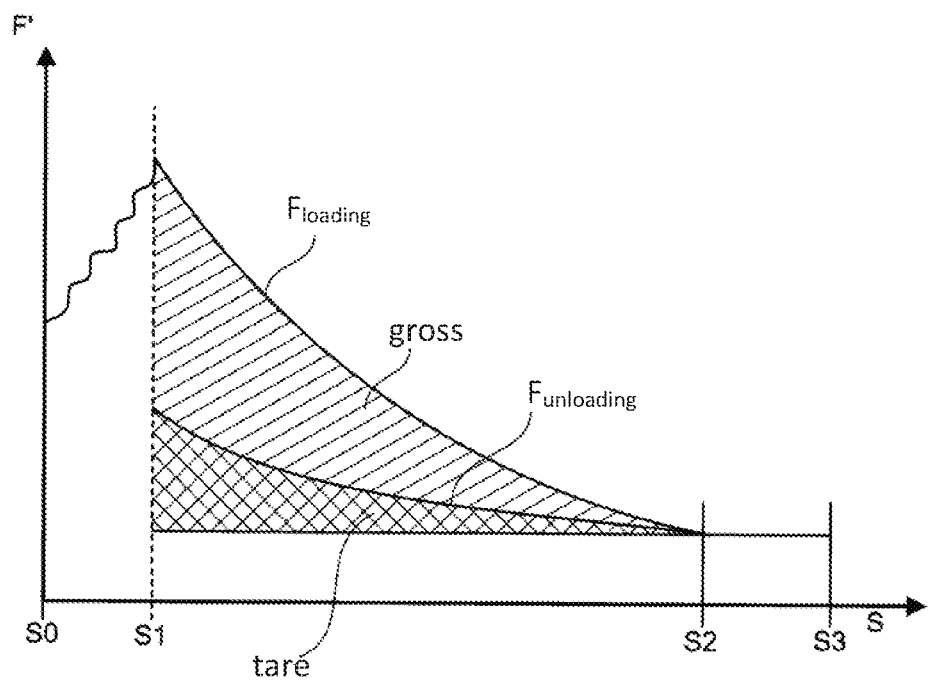

The invention is explained in more detail hereinafter on the basis of the figures. In the figures:

FIGS. 1a to 1d show a view of a goods vehicle for transporting large containers also, equipped with a load lifting device of the type mentioned above, FIG. 2a schematically shows a view of the loading surface of a goods vehicle according to the FIGS. 1a to 1d with a first embodiment of the present invention, FIG. 2b shows an enlarged view of a support section of the support of FIG. 2a with a load measuring cell installed therein, FIG. 3a schematically shows a view from the side of the rear part of a goods vehicle with a preferred modification of the first embodiment according to FIG. 2a, FIG. 3b schematically shows a view from above onto the chassis of the goods vehicle according to the side view of FIG. 3a with the arrangement of the rollers, FIG. 3c schematically shows the view AA from FIG. 3b, FIG. 4a shows a view of a support of the load lifting device of FIGS. 1a to 1d according to a second preferred embodiment, FIG. 4b shows an enlarged view of a support section of the support of FIG. 4a with the load measuring cell installed therein, FIG. 4c shows the load measuring cell of FIG. 4b, FIG. 4d shows a view according to FIG. 4b, wherein a further embodiment of a load measuring cell is provided, and FIG. 4e by way of example shows the course of the lateral force or thrust stress in the weighing window when loading and unloading according to the second preferred embodiment.

Using the example of a goods vehicle 1, how a container 3 can be loaded onto the goods vehicle 1 using a load lifting device 2 known in the prior art is illustrated in the FIGS. 1a to 1d.

FIG. 1a shows the goods vehicle 1 with a loading surface 4, onto which the container 3 is to be brought. To this end, a support 5 of the load lifting device 2 which can be moved for displacing the container 3 can be extended until its hook 6 arranged at its end can engage into a handle 7 constructed in an mirror-identical manner at the front end 10 of the container 3. The driving of the support 5 takes place via a hydraulic cylinder 8. Depending on the construction of the load lifting device 2, a trestle 9, which can be moved longitudinally, is additionally provided on the loading surface 4, which makes it possible to load large (here: long) containers 3 by means of the load lifting device 2.

According to FIG. 1b, the support 5 is retracted to such an extent that the front end 10 of the container 3 is lifted over the edge 11 of the loading surface 4 and has been pulled some way onto the same. To this end, the base of the container is pushed over the edge 11 of the loading surface 4 which has rollers 12 for this purpose. In this process, the rollers 12 support a substantial part of the weight of the container 3.

FIG. 1c shows the loading process in a phase in which the rear end of the container 3 has lifted off from the ground, so that the rollers 12 essentially support the entire weight of the container 3. FIG. 1d finally shows the container 3 in the transport position on the loading surface 4 of the goods vehicle 1.

The loading process can be divided into three phases:

$1^{st}$ phase: grasping and lifting the front end 10 of the container 3, subsequently pulling up the lifted end 10 over the rear edge 11 of the loading surface 4 so far until the rear end 13 of the container 3 trailing on the ground would lift if pulled up further.

$2^{nd}$ phase: Further pulling up of the front end 10 towards the front over the loading surface, so that the rear end 13 of the container 3 lifts off the ground to such an extent that the container 3 can be lowered by means of its front end 10 onto the loading surface 4 and thus rests over its length on the same. The container 3 is lifted during the displacement from the ground and rests on the edge of the loading surface 4.

$3^{rd}$ phase: If necessary, pull the container 3, which is resting over its length on the loading surface, forwards. The container 3 is lifted during the displacement from the ground and rests on the edge of the loading surface 4.

For the unloading process, these phases are essentially run through in reverse, with the difference that after the rear end 13 of the container 3 touches the ground, the goods vehicle is generally driven forwards in order to complete the unloading process.

The application of the present invention is not bound to the load lifting device shown by way of example according to the FIGS. 1a to 1d, but rather can always be applied when a load is pushed over the edge of a raised loading surface and thus pulled onto the same or pushed down from the same using a load lifting device of the type shown in the FIGS. 1a to 1d (i.e. with one or with a plurality of supports which can be moved for the displacement of a load).

FIG. 2a schematically shows a view of the loading surface of a goods vehicle 1 according to the FIGS. 1a to 1c, wherein the front part of the goods vehicle with the driver's cab and likewise the hydraulic cylinder 8 and also the trestle 9 are omitted so as to not overload the figure. By contrast, a bearing 13 is illustrated here, on which the container 10 is placed after the completed work operation of the load lifting device 2. In the figure, it is illustrated that the container 10 is not yet placed, i.e. the movement position of the support 5 of the load lifting device 2 corresponds to a position directly before the placing or the placement point of the load on the loading surface 4. As a result, the container 10 rests on the one hand on the rollers 12 and on the other hand hangs by means of its handle 7 on the hook 6.

In the support section 15, which for its part carries the hook 6, a load measuring cell 16 is arranged, which measures a force acting in the support section 15 during the work movement of the load measuring device 2. In the embodiment shown in the figure, the load measuring cell is located in the longitudinal axis 17 of the support section 15, wherein the measured force is the axial force A acting in the support section 15, generated by the handle 7. In the movement position illustrated directly before the placement position, the support section 15 is orientated essentially vertically, so that a possible lateral force acting in the support section 15 is negligibly small.

The load measuring cell 16 is further operatively connected to a computer not illustrated in the figure, which is constructed to analyse the force signals of the load measuring cell 16 and to determine the weight of the load (i.e. of the container 10) on the basis of the same. This takes place according to the invention in that the computer determines the moment at which the reverse side 17 of the container 10 is located immediately above the rollers 12 from the geometry of the container 10 and the position of the load lifting device 2, as is illustrated in the figure. Assuming a uniform filling of the container 10 (i.e. assuming that the centre of gravity of the container 10 lies in the centre between the rollers 12 and the handle 7), the weight of the container 10 is simple to calculate on the basis of the measured axial force A. This assumption delivers sufficiently accurate weight results for most loads (for example bulk materials).

Containers for goods vehicle transport are generally standardised. Accordingly, a memory of the computer preferably contains a catalogue of standard data of such containers, wherein the driver of the goods vehicle can select the container to be loaded on site by means of an input unit of the computer from the catalogue thereof. Alternatively, the driver can also input the actual dimension (here the length of the container) via the input unit, so that the computer can execute the necessary mathematical operations on the basis of the input.

The person skilled in the art is readily able to operatively arrange a conventional computer including the associated memory in a goods vehicle and to write the corresponding programs for the calculation of the weight of the load and install the same on the computer.

FIG. 2b shows an enlarged view of the support section 15 of the support 5 of the load measuring apparatus 2 of FIG. 2a with a load measuring cell 16 installed therein, which is constructed as a cylindrical tube 20 and is inserted into a circular hole 21 of the support section 15 and is preferably welded therein.

The axial force A or the compressive stresses resulting therefrom result in an elliptical deformation of the tube 30 inserted into the hole 31, due to the shortening of the support section 15, wherein the main axis 18 of the resulting ellipse runs transversely to the direction of the longitudinal axis 17 and the minor axis thereof runs in the direction of the longitudinal axis 17. Two deformation sensors 22 and 23 are arranged in the tube 20, the deformation sensor 22 in the direction of the longitudinal axis 17 and the deformation sensor 23 transversely thereto, i.e. at an angle of essentially 90° to one another.

In the case of changed axial force A, the deformation sensor 22 measures the reduction in size of the diameter of the tube 20 assigned to it, and the deformation sensor 23 measures the enlargement of the diameter of the tube 20 assigned to it. These measured data give the geometry of the elliptical deformation of the tube 30 and thus the value of the axial force A and enable the calculation of the weight of the load, as is illustrated above.

Preferably, the deformation sensors 22 and 23 are constructed as vibrating wire sensors which are known to the person skilled in the art (in this regard also see the description of the FIGS. 4b and 4c below).

Such a load cell 16 can be inserted into a support very simply into a support 5 with the aid of a simple hole, i.e. practically without outlay. In particular, the attachments of the goods vehicle neither have to be disassembled nor changed.

FIG. 3a schematically shows the view of the rear part of the goods vehicle according to FIG. 2a, wherein a preferred modification of the realisation shown on the basis of FIGS. 2a and 2b is illustrated. Contrary to the embodiment of FIG. 2a, the rollers 12 are not arranged at the rear end of the loading surface 4, but rather offset somewhat towards the front. Such attachments are fundamentally known to the person skilled in the art.

This arrangement is illustrated in more detail in FIG. 3b, wherein the figure schematically shows a view from above onto the chassis 30 of the goods vehicle 1 (FIGS. 1a to c and FIG. 2a).

Two longitudinal supports 31, 32 of the chassis 30, as are generally possessed by goods vehicles delivered without attachments. The design 34 illustrated here by way of example for the transporting of a load, here of containers 10, consists of a support plate 35 welded below onto the longitudinal supports 31, 32, which supports two pairs of vertically protruding short plates 36 with eyes 37 for accommodating one axle 38 in each case, by means of which a roller support 39 is in turn pivotably linked. Each roller support 39 has an angled part 40 which is mounted on one side on the axle 38 assigned thereto and on the other side runs into a support which runs forwards 41, wherein the support 41 rests on a bearing 42 in the operating position. Each angled part 40 in turn supports a shaft bearing 43 for the shaft 44 of a roller 12.

The upwardly directed upsweep of the two angled parts 42 allows a raised bearing of the rollers 12 in such a manner that the running surface thereof protrudes over the upper side of the longitudinal supports 31, 32, so that a load pulled up onto a loading surface 4 (FIG. 2a) on the rollers 12 can be moved easily. The pivotable bearing of the roller supports 39 on the axles 38 makes it possible to fold the same up for mounting and maintaining the rollers 12.

FIG. 3c shows the view AA from FIG. 3b.

It emerges from FIGS. 3b and 3c that a distance a exists between the geometrical longitudinal axis 45 of the axles 38 and the geometric rotational axis 46 of the rollers 12 or the approximate contact line of a container running on the rollers 12. In the event of loading the roller supports 39 by means of a container running over the rollers 12, a flexural torque of size a·R is introduced into the roller supports 39, wherein, as mentioned, a is the distance of the point of introduction of the force into the roller supports 39 from the bearing thereof on the chassis 30 and R is the force which acts through the bearing container onto the relevant roller 12. This flexural torque is independent of the length of the support 41 running forwards or the location of the bearing 42, i.e. is constant over the length of the roller support 39. Thus, the support 41 running forwards flexes constantly over its length, which flexion is detected by sensors 48 and the flexion signals thereof can be analysed in the computer: the bending line of the supports 41 results from the flexion, together with the geometry thereof the moment acting results, and with the known distance a, the respective force R acting on a roller 12 results. It is advantageous here that the position of the sensors 48 is location-independent, that is to say in the case of alteration according to the invention, it is possible to place where the outlay therefor is smallest.

The sensors 48 for the flexion of the support 41 can be constructed as simple strain gauges. The arrangement of Strain gauges for measuring the flexion of a support and also the analysis of the measured data are known to the person skilled in the art.

Alternatively, a sensor for the lateral force acting in the support can (not shown in the figure) also be used. Preferably, a load measuring cell according to FIGS. 4b and 4c can then be inserted into the roller supports 39 (see the description of these figures). Such a load measuring cell consists of a tube with two deformation sensors, wherein the tube is here to be inserted perpendicularly to the image plane in the roller support 39 of FIG. 3c and the deformation sensors are arranged perpendicularly to one another, but at an angle of 45° to the horizontal (in FIG. 3c to the longitudinal axis of the roller support 39). If a weight acts on the rollers 12, a corresponding lateral force acts in the roller support 39 (or corresponding thrust stresses), which deform the tube, wherein the deformation can in turn be detected by means of the deformation sensors and determined by the computer by means of the measuring signals thereof. The computer can further determine the lateral force and thus the weight acting on the rollers 12 from the deformation and the geometry of the roller support 39. As the lateral force is constant over the length of the roller support 12, a problem-free installation of the corresponding load measuring cell, which is associated with very low costs, results in turn.

Thus, a three point measurement results for the weight of a load heaved onto the loading surface 4, i.e. the measurement of the axial force A and the forces R acting on the respective roller 12. Such a three point measurement has the advantage that the weight of inhomogeneously loaded containers can be determined with practically any desired precision, wherein the costs are still small compared to the conventional load measuring devices and both the load cell 16 and the strain gauges 48 (or tubular lateral force sensors corresponding to the load cell 16) can be installed with very little outlay on a pre-existing load lifting device 2, in turn without changing or disassembling the structure. This likewise applies for the associated computer which processes the signals of the load cell 16 or the strain gauges 48.

FIG. 4a shows a further embodiment of the present invention. Illustrated is a view of the angled support 5 of the load lifting device 2 of FIGS. 1a to 1d in the position of FIG. 2c, that is to say in the 2nd phase of the load lifting process. The support 5 is here preferably constructed as a rectangular tube (but can also have other cross sections) and is in engagement with the handle 7 of the container 3 by means of its hook 6. The remaining elements of the load lifting device 2, likewise the bearing surface 4 of the goods vehicle are omitted so as not to overload the figure. According to the invention, such a load lifting device modified to form a load measuring device has a load measuring cell 16 arranged in a support section 15 of the support 5 for determining the lateral force Q acting in the support section 15 during the work movement.

In turn, a computer, which is also not illustrated so as to not overload the figure, is provided on a suitable location to be determined by the person skilled in the art on the load measuring device itself or in the goods vehicle (preferably in the driver's cab), which computer which can receive and analyse lateral force signals of the load measuring cell 16 via a suitable cable connection (to be readily determined by the person skilled in the art), in order to determine the weight of the load moved mathematically from the same, as is illustrated further below.

As the support 5 pivots about its bearing 50 in the direction of the arrow 51, it exerts a tensile force F standing perpendicularly to the pivot radius 52 thereof on the handle 7 of the container 3, the reaction F' thereof acting on the support 5 for its part can be divided into two components, namely into a component Q directed perpendicularly to the longitudinal axis 54 of the support section 15, which corresponds to the lateral force acting in the support section 15, and into a tensile force Z lying on the longitudinal axis 20.

The support section 15 is deformed by means of the loading prevailing in it due to the force F', wherein the load measuring cell 16 in the present embodiment is then constructed in such a manner that due to the deformation thereof, the prevailing lateral force Q can be determined easily, as is described in more detail below with reference to FIG. 4b. The determination of the lateral force Q is particularly advantageous, as the lateral force Q remains constant over the length of the support section 15, that is to say the load measuring cell 16 can be inserted easily in the support section 15 at a location beneficial for the mounting thereof, without other boundary conditions having to be taken into account with regards to the loading of the support section 15, as would be the case e.g. for the determination of the bending of the support section 15 of the support, as the flexural moments would grow proportionally to the distance of the force acting.

In other words, it is the case that by means of the use according to the invention of the lateral force as output variable for the determination of the weight of the container 3, a modification of a load lifting device which is particularly simple to perform and thus cost-effective is possible.

It can be seen from FIG. 4a that the geometry of the load measuring apparatus (or the load lifting device 2) in connection with the geometry of the container 3 determines the size of the lateral force Q in the case of a given tensile force F. In this case, the length and height of the bearing surface 4, i.e. the position of the rollers 12 is counted with respect to the geometry of the load measuring apparatus.) For a given geometry, i.e. in the case of known dimensions of the container to be loaded onto an actual goods vehicle, the force F can conversely be determined for each instantaneous position of the container 3 (and thus for each movement position of the support 5) from the lateral force Q, and by means of suitable calculation, the weight of the container 3 can in turn be determined therefrom.

It may also be noted here that the dimension of the conventionally used containers (particularly the height of the handle 7) are standardised, so that standard values can be used, which can be compiled in a catalogue which can be stored in the computer for determining the load weight. Of course, it is also conceivable to store such data in memory chips, which can then be connected to the computer as external data carriers. Likewise, it is conceivable that the data relating to the container 3 (whether these be standard data or not) are stored in a chip belonging to the container and can be read out of the same and input into the computer.

If the dimensions of the load, i.e. the container 3 are not known, the height of the handle 7 can be determined at least approximately from the position of the load measuring device when grasping the container 3 and used for calculating the weight of the load. Likewise with respect to the length of the container 3, where additionally to the data from the position of the load measuring during the displacement of the load, the data from a distance sensor are also used, which sensor is arranged on the loading surface 4, preferably close to the edge 11 and detects the distance between the loading surface 4 and the base of the container 3. By means of this distance, the inclined position of the container 3 is detected and from the inclined position together with the height of the handle 7 at the moment of lifting the rear end 13 of the container 3, the length thereof is detected. The use of other inclination sensors is likewise in accordance with the invention. The moment of lifting in turn can be detected by means of a suitable sensor or in that the container no longer shakes (or shakes to a reduced extent), wherein the degree of shaking is determined from a lateral force portion in the support section 15 which changes back and forth abruptly.

If measurement is to be carried out during movement, that is to say dynamically, the inclinometer formed by the distance sensor can be expanded by means of an acceleration measuring device. Thus, the measured values can be adjusted for acceleration.

Further, the geometry of the load measuring device actually used is known in each case and can likewise be stored as a suitable data set in the computer.

FIG. 4b shows an enlarged view of a support section 15 of the support 5 of FIG. 2 with the a load measuring cell 16 installed therein, which is constructed as a cylindrical tube 60 and is inserted into a circular hole 61 of the support section 15 and is preferably welded therein.

The lateral force Q or the thrust stress T resulting therefrom results in an elliptical deformation of the tube 60 inserted into the hole 61, wherein the main axis of the resulting ellipse lies in the direction of the axis 62 or the axis 63, depending on the direction of the acting thrust stress T, and the minor axis thereof lies on the respective other axis 63 or 62.

FIG. 4c shows an enlarged view of the load measuring cell 16 of FIG. 3, wherein in turn the tube 60 welded into the hole 61 and additionally two deformation sensors 65, 66 inserted into the tube 60 can be seen. The sensors 65, 66 lie on the axes 62, 63 of the ellipse to be expected, which takes on the cross section of the tube 60 on the basis of the acting lateral force Q. In summary, the sensors 65, 66 are essentially at right angles to one another and essentially at an angle of 45° to the longitudinal axis 52 of the support section 15.

Each of the two sensors 65, 66 has two force inputs 67, 68 which are for example each inserted with prestress into a suitably introduced depression in the wall of the tube 60. A further possibility for inserting the sensors 65, 66 consists in screwing the force inputs 67, 68 onto two tabs welded into the tube 60 in each case. The inner structure of the sensors 65, 66 as vibrating wire sensors, which is known per se, means for example that the tension of a vibrating wire changes in each of the sensors 65, 66, when the path-dependent force on the two force inputs 67, 68 changes. Thus, the shortening of the one diameter of the tube 60 and the enlargement of the other are simultaneously measured and placed into a relationship with one another by means of a computer. The simultaneous measurement at the same location is not inherently necessary (due to the constancy of the lateral force, the deformation sensors could therefore be accommodated at various locations in the support section 15), but has the advantage that the temperatures of the two sensors 65, 66 are likewise the same, so that the measurement results are essentially freed from a temperature sensitivity of the sensors.

Instead of the use of vibrating wires, the deformation of the tube 60 can of course be determined via other parameters accessible to measurement. Suitable for this for example are attached strain gauges or optical measurement methods using Brillouin sensors.

To protect against disruptive environmental influences, such as dust, moisture and mechanical influences, the tube 60 can be closed on both sides in such a manner that these influences are kept at bay. The person skilled in the art recognises that these realisations also apply to the embodiment of the load measuring cell 16 illustrated in FIG. 2b.

FIG. 4d shows a section from the view of FIG. 4a, wherein a further embodiment of a load measuring cell 70 is provided arranged between the hook 6 and the adjacent support section 15.

The fastening of the load measuring cell 70 takes place in such a manner that only the forces (or thrust stresses) in the direction of the lateral force Q (i.e. perpendicular to the longitudinal axis 20) are measured by the same. A measuring cell which can be calibrated can be used as measuring cell 70, for example the applicant's load cell model SO/ED21. The analysis of the measurement results of the load measuring cell 70 takes place, like all other analysis tasks in all embodiments according to the invention, on the associated computer.

By way of example, FIG. 4e shows the course of the value of the tensile force F over the working travel s covered by the hook 7 during the loading of a container 3 onto a goods vehicle 1. In this case, the tensile force F during the loading process of a filled container 3 is referenced with $F_{loading}$ and the tensile force of an empty container 3 during the unloading process is referenced with $F_{unloading}$. The force F is calculated from the lateral force Q detected by the load measuring cell 16 by means of the computer, see the description of FIG. 2.

In the graph of FIG. 4e, the three phases mentioned in the description of FIG. 1c can be differentiated:

$F_{loading}$: In the first phase, the container 3 is grasped by the hook 7 (the working travel begins at $s_0$), lifted at the front and pulled forwards until the rear end 13 thereof is about to be lifted, which is the case at $s_1$. In this phase, the container 3 shakes, as the end 13 thereof is hauled over the ground; the required tensile force $F_{loading}$ increases.

In the second phase, beginning at $s_1$ and ending at $s_2$, the container 3 is no longer in contact with the floor, the movement is silent. The required force $F_{loading}$ falls until the front end 10 of the container is placed onto the loading surface 4 or preferably (see below) is lowered to just a small height above the loading surface 4.

In the third phase, beginning at $s_2$ and ending at $s_3$, the container 3 is pushed forward again until it has either reached its desired final position or the frictional force when pushing forward the container 3 is determined. $F_{loading}$ (likewise $F_{unloading}$) in this phase corresponds to the frictional force, as the container is pushed essentially horizontally, the weight therefore does not play a role during the displacement operation.

The various boundary conditions for the displacement of the container 3 between $s_2$ and $s_3$ may be:

Once, the loading surface (together with the rollers 12 on the edge 11 thereof) can itself likewise contain rollers, by means of which the container 3 can be displaced in a lying manner on the loading surface 4. Thus, the frictional force of the container 3 lowered onto the loading surface 4 has a similar value to the frictional force which is generated by means of the rollers 12 during the second phase.

Then, the loading surface 4 itself can be constructed without rollers, so that the frictional force of the container 3 lowered onto the loading surface 4 is considerably larger in the third phase than the frictional force arising during the second phase at the rollers 12 of the edge 11.

Finally, although the container 3 can preferably be lowered in the second phase, it is not lowered to such an extent that it touches the loading surface 4, and is displaced in this position with only slightly raised front end 10 in the third phase $s_2$ and $s_3$. As a result, as before, it only rests on the rollers 12 on the edge 11, so that the tensile force F corresponds quite precisely with the frictional force thereof. This type of measurement of the frictional force is preferred.

$F_{unloading}$: The converse applies when the container 3 is unloaded: preferably at $s_3$, or else at $s_2$, the front end 10 thereof is lifted and pushed backwards until the rear end thereof sits on the ground at $s_1$. $F_{unloading}$ increases after $s_2$.

The weighing window for determining the weight of a container 3 to be loaded begins accordingly at $s_1$ and ends at $s_2$, preferably however only at $s_3$:

In spite of the use of rollers 12 on the loading edge 11, it cannot be avoided that the frictional forces arising at the loading edge 11 during the pulling up of the container are large enough to distort the measurement result (if rollers 12 are used at the loading edge, the friction—more precisely the rolling resistance, may be between 1 and 10% of the tensile force F), so than a correction variable is required. On the one hand, for a given load measuring apparatus, this may be a constant, e.g. determined by means of experiments, or preferably the correction variable determined correctly during loading, which then takes account of the actual weigh of the container. This correctly determined correction variable results from the advance of the container 3 between $s_2$ and $s_3$ and directly from the then calculated tensile force F. As mentioned above, to this end, although the container 3 is lowered between $s_2$ and $s_3$, it is in such a manner that the front end 10 thereof is only slightly lifted, so that the container 3 does not yet touch the loading surface 4; then the correction variable can be determined with great precision.

Thus, both for the loading and the unloading process, the weighing window is delimited on one side by the moment at which the rear end of the load is lifted from the ground or rests on the same ($s_1$).

On the other side, the weighing window is delimited by the moment at which the front end of the load is put down on the loading surface by means of the load lifting device or is lifted from the same ($s_2$ or $s_3$) or after the measurement, the frictional force is stopped (or is pushed for measurement).

Preferably, the weighing window has a zone adjoining its other side, which lies between $s_2$ and $s_3$, in which, as described above, the front end 10 of the container 3 is displaced in an only slightly lifted manner over a stretch along the loading surface 4, in order to use the lateral force determined in the process for mathematically determining a correction variable corresponding to the frictional force of the load. The correction variable in turn is used in the mathematical determination of the weight of the load adjusted for friction.

As mentioned in the description of FIG. 4a, the weight of the container 3 can be calculated from the course of the force F by means of suitable calculation. This preferably takes place in that the area below the curve of F in the weighing window is determined by integration, which constitutes a measure for the weight of the container and graphically contains the work (i.e. force times distance) for the forwards displacement of the container, against the frictional force, plus the work for the lifting up of the container 3 onto the loading surface 4 (vice versa accordingly for the unloading process).

For increased accuracy, an area portion (white area in the graph of FIG. 4e between $s_1$ and $s_3$) corresponding to the frictional force is subtracted from the overall area below the curve $F_{loading}$ or $F_{unloading}$, so that the influence of the frictional force is eliminated. The shaded areas "gross" and "tare" are then a measure adjusted for the frictional force for the weight of a container which is full, to be loaded or empty, to be unloaded.

As the geometry of the load measuring device and container is known, and the movement takes place inevitably, the vertical component of F can also be determined at any point between $s_1$ and $s_2$ or $s_3$, integrated via the height covered and divided by the overall height, which gives the desired weight of the container 3.

On the other hand, as in the graph of FIG. 4e, the area below the curve F already constitutes a measure for the weight of the container 3, the multiplication of the area value (gross or tare, as always depending on whether e.g. a full container 3 is loaded or an empty container is unloaded) by a constant lead directly to the desired weight. This constant is a geometry factor, the value of which depends on the value of the geometry of the load measuring device and the container 3.

The geometry factor can be determined mathematically on the one hand and by means of experiments on the other hand. Preferably, it is determined mathematically, input into the data memory of the computer, whereupon the load measuring apparatus is calibrated with different containers in a field test.

The small variations of the rolling friction coefficient during the work operation are averaged out by the integration.

Of course, the area value can only be calculated approximately, in that the lateral force Q and thus the force F are determined and used mathematically only for individual values between $s_1$ and $s_3$.

Accordingly, the person skilled in the art will determine the number of values of F to be determined between $s_1$ and $s_3$ and thus the degree of linearisation of the curves for F in the graph according to FIG. 4e depending on the desired precision of the weight information.

Finally, it may also be pointed out that the calculation procedure according to FIG. 4e can also take place over a partial height.

Likewise, starting from the present description, the person skilled in the art can determine a calculation procedure which is suitable in the actual case, in accordance with which the computer determines the weight of the container from the signal values of the load measuring cell. The corresponding programming and also the equipping of the computer with regards to the necessary hardware is likewise known to the person skilled in the art in the context of their expert knowledge and readily possible.

Finally, it is known that a transponder chip can be attached on a container 3 (not illustrated). This carries the type characteristic of the container 3 together with individualising features, such as a serial number or the unladen weight. Thus, it is indicated to equip the goods vehicle 1 with a reader which can read this information from the transponder chip and transmit the same to the computer. Such a transponder chip also carries the information for permissible maximum load both for the container 3 as a whole and also for the load on the hook 6. This can be used in order to prevent the lifting and also the loading of an overfilled container 3 or in the event of overloading, to generate a corresponding optical or/and acoustic signal.

An alarm can also be provided in yet another further embodiment if the frictional force exceeds a predetermined value, e.g. as a signal for the fact that the rollers 12 are not functional (maintenance) or that the container 3 is not lying on the same correctly.

In summary, according to the invention, a method results according to the present invention for measuring the weight of a load which is displaced with a load lifting device over the edge of a raised loading surface and thus pulled onto the same or pushed down from the same, wherein during this operating process and as long as the load rests in a raised manner on the edge of the loading surface during the displacement from the ground, in a support loaded by the load, which moves the load, of the load lifting device, during the passage of the same through a predetermined movement position, a force currently acting in it due to the displacement of the load is measured and the same is used for mathematically determining the weight of the load.

In the first exemplary embodiment according to the FIGS. 3a and 3b, the currently acting axial force in the support of the load lifting device is measured for a load with uniformly distributed mass. In a preferred modification thereof, in the event of non-uniformly distributed mass, the forces acting on the rollers arranged on the edge of the loading surface are additionally detected and included in the calculation.

In a further embodiment according to the FIGS. 4a to 4e, for a load with uniformly or non-uniformly distributed mass, the lateral force acting in the support of the load lifting device over a weighing window is measured and the weight is determined from the course thereof. Preferably, in this case, the frictional force arising during the displacement of the load is likewise detected and used as a correction factor for the precise measurement of the weight.

A load measuring device is used for executing this method, with at least one support which can be moved in such a manner for the displacement of a load that the load is displaced over the edge of a raised loading surface and thus pulled onto the same or pushed down from the same, with a load measuring cell, arranged in a support section of the support, for determining a force acting in the support section during the work movement and with a computer operatively connected to the load measuring cell, which is constructed to analyse the force signals of the load measuring cell in a predetermined movement position of the support section and to determine the weight of the load using the same.

In the first embodiment according to FIG. 2b, the deformation sensors of the load measuring cell are preferably arranged parallel and transversely to the longitudinal axis of the support section. In a second embodiment, preferably at an angle of 45° thereto.

The invention claimed is:

1. A method for measuring a weight of a load, the method comprising:
    arranging the load on a raised loading surface;
    displacing the load with a load lifting device over an edge of the raised loading surface, the load lifting device including driving means and a rigid support driven by the driving means, the rigid support moving the load and being loaded by the load;
    measuring, during passage of the load through a predetermined movement position, at least one of an axial force and a lateral force acting in the rigid support of the load lifting device; and determining a value of at least one of the axial force and the lateral force a weight of the load based on at least one of the axial force and the lateral force.

2. The method according to claim 1, wherein the axial force acting in support of the load lifting device is measured and the predetermined movement position of the rigid support of the load lifting device corresponds to a position of the rigid support directly before a placement point of the load on the raised loading surface.

3. The method according to claim 2, comprising utilizing a force thereof acting on the edge of the raised loading surface to calculate the weight of the load.

4. The method according to claim 3, comprising forming the edge of the raised loading surface with rollers arranged on at least one roller support provided on the raised loading surface;
wherein weight forces of the load accommodated by the rollers during passage through the predetermined movement position of the rigid support of the load lifting device are determined from a flexural torque acting in the at least one roller support due to the load and additionally used for mathematically determining the weight of the load; and
wherein a moment acting in the at least one roller support is preferably detected by means of flexion of the roller support.

5. The method according to claim 3, comprising forming an edge of the raised loading surface with rollers, which are arranged on at least one roller support provided on the raised loading surface;
wherein weight forces of the load accommodated by the rollers during the passage through the predetermined movement position of the rigid support of the load lifting device are determined from the lateral force acting in the at least one roller support due to the load; and
wherein the lateral force is preferably determined by means of a load measuring sensor which has two deformation sensors inserted into a tube at right angles to one another.

6. The method according to claim 1, comprising:
measuring the lateral force acting in the rigid support of the load lifting device;
wherein the predetermined movement position extends over a weighing window;
determining the weight of the load from the course of the lateral force in the weighing window; and
wherein the weighing window is preferably delimited on one side by the moment at which a rear end of the load is lifted from the ground or placed on the ground.

7. The method according to claim 5, comprising determining a moment at which a rear end of the load is lifted from the ground or placed on the ground mathematically from geometry of the load lifting device and the geometry of the load or is detected by means of a sensor or is detected due to reduced shaking of the load, wherein a degree of shaking is preferably determined from a lateral force portion which changes back and forth rapidly.

8. The method according to claim 6, comprising delimiting the weighing window on the other side by the moment at which the front end of the load is placed on the raised loading surface or is lifted from the raised loading surface by means of the load lifting device.

9. The method according to claim 8, comprising defining a zone within the weighing window adjoining the other side, in which the load is displaced along a path along the raised loading surface with an only slightly raised front end, and wherein the lateral force is used for mathematically determining a correction variable corresponding to the frictional force of the load, which is used in turn for mathematically determining the weight of the load adjusted for friction.

10. The method according to claim 6, wherein mathematical determination of the load comprises:
a) determining the lateral force as a function of progressive transport movement of the load lifting device in the measuring window, calculating therefrom a tensile force of the load lifting device and calculating an area value corresponding to the product of the tensile force and path of the progressive transport movement
b) multiplying the area value by a geometry factor for the load lifting device actually used and load which corresponds to a proportionality factor between the area value for a load weight and this load weight.

11. The method according to claim 10, comprising determining a proportionality factor before an actual work operation from geometry of the load lifting device and load and is calibrated by displacement of one or a plurality of standard loads.

12. A load measuring device comprising:
at least one rigid support which at least one rigid support can be moved in such a manner for displacement of a load over an edge of a raised loading surface;
a load measuring cell arranged in a support section of the rigid support, for determining a force acting in the support section during displacement of the load; and
a computer operatively connected to the load measuring cell, which computer analyzes the force signals of the load measuring cell in a predetermined movement position of the support section to determine the weight of the load.

13. The load measuring device according to claim 12, wherein the load measuring cell measures an axial force prevailing in the support section and the computer analyzes the axial force prevailing directly before placing of the load onto the raised loading surface and to determine the weight of the load on the basis of the axial force.

14. The load measuring device according to claim 12, wherein the load measuring cell comprises a tube and arranged perpendicularly to the longitudinal axis of the support section;
wherein two deformation sensors are inserted in the tube and arranged at an angle of essentially 90° with respect to one another in such a manner that in the case of changed axial force, a first deformation sensor measures enlargement of the one assigned diameter of the tube and a second deformation sensor measures a reduction in size of the other diameter assigned to the tube; and
wherein the deformation sensors are preferably constructed as vibrating wire sensors.

15. The load measuring device according to claim 12, wherein rollers for the displacement of the load over the edge are provided at the edge of the raised loading surface, which rollers are arranged on at least one roller support which, in the event of a loading of the rollers by a load, flexes in accordance therewith, and further sensors are provided, which detect flexion of the at least one roller support, and wherein the computer is constructed to analyse the flexion signals of the sensors and likewise to use the flexion signals for determining the weight of the load.

16. The load measuring device according to claim 12, wherein the load measuring cell is constructed to measure the lateral force prevailing in the rigid support and the computer is constructed to calculate the weight of the load from the course of the lateral force in a predetermined measuring window.

17. The load measuring device according to claim 12, wherein the load measuring cell comprises a tube and is arranged perpendicularly both to a longitudinal axis of the support section and to the lateral force generated in the support section by means of movement of the load, and wherein two deformation sensors are inserted in the tube and arranged at an angle of essentially 90° with respect to one another in such a manner that in the case of changed lateral force, a first deformation sensor measures enlargement of the one assigned diameter of the tube and a second deformation sensor measures the reduction in size of the other diameter assigned to the tube, wherein the deformation sensors are preferably constructed as vibrating wire sensors.

18. A computer-program product comprising a non-transitory computer-usable medium having computer-readable program code embodied therein, the computer-readable program code adapted to be executed to implement a method comprising:
   a) determining lateral force acting on a rigid support from signal values of a load measuring cell imbedded in the rigid support that moving a load and being loaded by the load as a function of progressive transport movement of a load lifting device in a measuring window
   b) calculating from the lateral force the tensile force of the load lifting device and calculating an area value corresponding to a product of the tensile force and paths of the progressive transport movement
   c) multiplying the area value by a geometry factor for the load lifting device and load which corresponds to a proportionality factor between the area value for a load weight and this load weight, and wherein the computer is further constructed to store this product in a memory assigned to it and/or to display the product as weight of the load.

19. The computer-program product according to claim 18, wherein the computer comprises a non-transitory computer-usable medium having computer-readable program code embodied therein, the computer-readable program code adapted to be executed to implement a method comprising:
   c) to determine a correction variable corresponding to the frictional force from the signal values of the load measuring cell during the advance of the load along a raised loading surface between $s_2$ and $s_3$ and
   d) to process this correction variable using the product of area value and proportionality factor to give a more accurate value for the weight.

20. The load measuring device according to claim 12, wherein the computer is adapted to at least one of store determined data about work operations performed on an external storage medium and to read data relating to the load, from an external storage medium and to use the data for determining the weight of the load.

* * * * *